US010479950B2

(12) United States Patent
Stevenson et al.

(10) Patent No.: US 10,479,950 B2
(45) Date of Patent: *Nov. 19, 2019

(54) QUATERNARY AMMONIUM AMIDE AND/OR ESTER SALTS

(71) Applicant: The Lubrizol Corporation, Wickliffe, OH (US)

(72) Inventors: Paul R. Stevenson, Belper (GB); James C. Ray, Mentor, OH (US); David J. Moreton, Belper (GB); James H. Bush, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/660,306

(22) Filed: Jul. 26, 2017

(65) Prior Publication Data

US 2017/0321137 A1 Nov. 9, 2017

Related U.S. Application Data

(63) Continuation of application No. 14/609,496, filed on Jan. 30, 2015, now Pat. No. 10,023,819, which is a continuation of application No. 13/319,726, filed as application No. PCT/US2010/033806 on May 6, 2010, now Pat. No. 8,961,623.

(60) Provisional application No. 61/178,509, filed on May 15, 2009.

(51) Int. Cl.
| | | |
|---|---|---|
| *C10L 1/22* | (2006.01) | |
| *C10L 1/238* | (2006.01) | |
| *C10L 1/222* | (2006.01) | |
| *C10L 1/224* | (2006.01) | |
| *C10L 1/2383* | (2006.01) | |
| *C10L 10/18* | (2006.01) | |
| *C08F 8/44* | (2006.01) | |
| *C08F 110/10* | (2006.01) | |
| *C10L 10/02* | (2006.01) | |
| *C10L 10/04* | (2006.01) | |
| *F02B 43/02* | (2006.01) | |
| *F02B 77/04* | (2006.01) | |
| *F23J 7/00* | (2006.01) | |
| *C08F 8/46* | (2006.01) | |

(52) U.S. Cl.
CPC .............. *C10L 1/2381* (2013.01); *C08F 8/44* (2013.01); *C08F 8/46* (2013.01); *C08F 110/10* (2013.01); *C10L 1/224* (2013.01); *C10L 1/2222* (2013.01); *C10L 1/2383* (2013.01); *C10L 10/02* (2013.01); *C10L 10/04* (2013.01); *C10L 10/18* (2013.01); *F02B 43/02* (2013.01); *F02B 77/04* (2013.01); *F23J 7/00* (2013.01); *C10L 2200/0259* (2013.01); *C10L 2200/0423* (2013.01); *C10L 2230/14* (2013.01); *C10L 2250/04* (2013.01); *C10L 2270/02* (2013.01); *C10L 2270/023* (2013.01)

(58) Field of Classification Search
CPC ...... C10L 1/2381; C10L 1/2222; C10L 1/224; C10L 1/2383; C10L 10/18; C10L 10/02; C10L 10/04; C10L 2200/0259; C10L 2200/0423; C10L 2230/14; C10L 2270/023; C10L 2250/04; C10L 2270/02; C08F 110/10; C08F 8/44; C08F 8/46; F02B 43/02; F02B 77/04; F23J 7/00
See application file for complete search history.

(56) References Cited

U.S. PATENT DOCUMENTS

| | | |
|---|---|---|
| 2,901,430 A | 8/1959 | Chiddix et al. |
| 3,215,707 A | 11/1965 | Rense |
| 3,401,119 A | 9/1968 | Froehlich |
| 4,248,719 A | 2/1981 | Chafetz et al. |
| 4,253,980 A | 3/1981 | Hammond et al. |
| 4,564,372 A | 1/1986 | Campbell |
| 4,581,151 A | 4/1986 | Campbell |
| 4,600,409 A | 7/1986 | Campbell |
| 4,612,132 A | 9/1986 | Wollenberg et al. |
| 6,774,181 B1 | 8/2004 | Bechara |
| 8,961,623 B2 * | 2/2015 | Stevenson ............. C10L 1/2222 44/422 |
| 2003/0026774 A1 | 2/2003 | Milbradt et al. |
| 2005/0081432 A1 | 4/2005 | Panchalingam et al. |
| 2007/0015681 A1 | 1/2007 | Allef et al. |
| 2007/0155636 A1 | 7/2007 | Koishikawa |
| 2008/0307698 A1 | 12/2008 | Barton et al. |

FOREIGN PATENT DOCUMENTS

| | | |
|---|---|---|
| DE | 10019142 | 10/2001 |
| EP | 0293192 | 11/1988 |
| EP | 0330375 | 8/1989 |
| EP | 0391735 | 10/1990 |
| EP | 0538819 | 8/1993 |
| GB | 1445993 | 8/1976 |
| WO | 2002102942 | 12/2002 |
| WO | 2003002788 | 1/2003 |
| WO | 2006/135881 A1 | 12/2006 |
| WO | 2007045386 | 4/2007 |
| WO | 2007128740 | 11/2007 |

* cited by examiner

*Primary Examiner* — Cephia D Toomer
(74) *Attorney, Agent, or Firm* — Iken Sans; Christopher Hilker; Teresan Gilbert

(57) ABSTRACT

The invention relates to quaternary ammonium amide and/or ester salts and their use as additives, including their use in fuels, such as diesel fuel. The invention particularly relates to the use of quaternary ammonium amide and/or ester salts as detergents in diesel fuels.

15 Claims, No Drawings

QUATERNARY AMMONIUM AMIDE AND/OR ESTER SALTS

FIELD OF THE INVENTION

The invention relates to quaternary ammonium amide and ester salts, processes for making them, and their use as additives, including their use in fuels, such as diesel fuel and fuel oils. The invention particularly relates to the use of quaternary ammonium amide and ester salts as detergents in fuels and the methods of making them.

BACKGROUND OF THE INVENTION

Hydrocarbon fuels generally contain numerous deposit-forming substances. When used in internal combustion engines (ICEs), deposits tend to form on and around constricted areas of the engine which are in contact with the fuel. In automobile engines deposits can build up on engine intake valves leading to progressive restriction of the gaseous fuel mixture flow into the combustion chamber and to valve sticking. There are two general types of inlet valve deposits, heavy deposits and thin deposits. These different types of deposits affect the performance of the fuel and the engine in slightly different ways. Heavy deposits are carbonaceous and oily in appearance. They cause flow restriction past the valves, which in turn reduces the maximum power of the engine, decreasing fuel economy and increasing emissions. Thin deposits tend to cause problems on starting the engine and increasing emissions.

As engines become more sensitive to deposits, it has become common practice to incorporate a detergent in the fuel composition for the purposes of inhibiting the formation, and facilitating the removal, of engine deposits, thereby improving engine performance and emissions.

It is known to use certain polyisobutylsuccinimide-derived quaternized PIB/amine dispersants/detergents as additives in fuel compositions. Polyisobutylsuccinimides may also be described as polyisobutylene succinimides. These quaternized dispersants/detergents are derived from traditional PIB/amine fuel additive compounds that have pendant tertiary amine sites which can be alkylated, i.e. quaternized, by a quaternizing agent, such as propylene oxide. Examples of these additives are disclosed in U.S. patent application US 2008/0307698.

However, there is a need for additives that provide the benefits described above while also exhibiting improved thermal stability and/or oil compatibility properties. There is also a need for additives that provide the benefits described above more efficiently, thus allowing for the use of lower additive treat rates while obtaining the same performance, thus reducing the cost and environmental impact of the additives as well as the compositions in which they are used. There is also a need for additives that provide the benefits described above which are less energy intensive to produce.

The present invention deals with a new class of detergents which offer significant improvements over traditional PIB/amine detergents, including polyisobutylsuccinimide-derived quaternized detergents. A new class of quaternized PIB/amines derived from polyisobutenyl succinamides and/or esters have now been discovered. These additives are more thermally stable than the imide variant and may be manufactured by a less energy-intensive process. The quaternized additives of the present invention not only perform at least equally as well as comparable polyisobutenyl succinimide quaternized additives, but can also provide that performance more efficiently and/or with improved thermal stability and/or oil compatibility.

SUMMARY OF THE INVENTION

The present invention provides a composition containing a quaternary ammonium amide and/or quaternary ammonium ester salt detergent, where the quaternized detergent comprises the reaction product of: (a) a non-quaternized amide and/or ester detergent having a tertiary amine functionality; and (b) a quaternizing agent. These additives may be derived from non-quaternized polyisobutylsuccinamides and/or esters, which are dispersants/detergents that have tertiary amine functionality and an amide and/or ester group, as opposed to the imide group containing materials discussed above.

The invention further provides for these additives and the methods of making them, where the additives are formed by a reaction completed in the presence of a protic solvent and/or is essentially free to free of any additional acid component other than the acid group(s) present in the structure of the detergent itself. The invention includes embodiments where the non-quaternized detergent is the condensation product of a hydrocarbyl-substituted acylating agent and a compound having an oxygen or nitrogen atom capable of condensing with the agent.

The present invention also provides fuel and additive concentrate compositions containing the additive described herein, where such compositions may further contain a fuel, and optionally one or more additional fuel additives.

The invention also provides for a process of making the additives described herein where the process includes: reacting a non-quaternized amide and/or ester detergent having a tertiary amine functionality with a quaternizing agent; thereby obtaining the quaternized detergent.

The processes of the present invention can include the steps of: (1) mixing a non-quaternized amide and/or ester detergent having an amine functionality, a quaternizing agent and a protic solvent; (2) heating the mixture to a temperature between about 50° C. to about 130° C.; (3) holding for the reaction to complete; thereby obtaining the quaternized amide and/or ester detergent. In some embodiments the process is free of the addition of any acid reactant, such as acetic acid. The product is obtained despite the absence of such an acid reactant.

The present invention further provides methods of operating internal combustion engines and/or open flame burners comprising supplying to the engines and/or open flame burners the fuel compositions described herein. The present invention also provides for the use of these additives as fuel detergents.

DETAILED DESCRIPTION OF THE INVENTION

Various preferred features and embodiments will be described below by way of non-limiting illustration.

The Quaternary Ammonium Amide and/or Ester Salt Detergent

The quaternary amide and/or ester detergents of the present invention may be described as the reaction product of: (a) a non-quaternized amide and/or ester detergent having a tertiary amine functionality; and (b) a quaternizing agent. In some embodiments the non-quaternized detergent is the condensation product of (i) a hydrocarbyl-substituted acylating agent and (ii) a compound having an oxygen or nitrogen atom capable of condensing with said acylating agent and further having at least one tertiary amino group.

a. The Non-Quaternized Amide and/or Ester Detergent

The non-quaternized amide and/or ester detergents suitable for use in the present invention include the condensation product of (i) a hydrocarbyl-substituted acylating agent and (ii) a compound having an oxygen or nitrogen atom capable of condensing with said acylating agent and further having at least one tertiary amino group, where the resulting detergent has at least one tertiary amino group and also contains an amide group and/or an ester group. Typically, the compound having an oxygen or nitrogen atom capable of condensing with said acylating agent determined whether the resulting detergent contains an amide group or an ester group. In some embodiments, the non-quaternized detergent, and so the resulting quaternized detergent is free of any imide groups. In some embodiments, the non-quaternized detergent, and so the resulting quaternized detergent is free of any ester groups. In these embodiments the detergent contains at least one, or just one, amide group.

The hydrocarbyl substituted acylating agent can be the reaction product of a long chain hydrocarbon, generally a polyolefin reacted with a monounsaturated carboxylic acid reactant, such as, (i) α,β-monounsaturated $C_4$ to $C_{10}$ dicarboxylic acid, such as, fumaric acid, itaconic acid, maleic acid; (ii) derivatives of (i) such as anhydrides or $C_1$ to $C_5$ alcohol derived mono- or diesters of (i); (iii) α,β-monounsaturated $C_3$ to $C_{10}$ monocarboxylic acid such as acrylic acid and methacrylic acid; or (iv) derivatives of (iii), such as, $C_1$ to $C_5$ alcohol derived esters of (iii) with any compound containing an olefinic bond represented by the general formula:

$$(R^1)(R^2)C=C(R^6)(CH(R^7)(R^8)) \qquad (I)$$

wherein each of $R^1$ and $R^2$ is independently hydrogen or a hydrocarbon based group; each of $R^6$, $R^7$ and $R^8$ is independently hydrogen or a hydrocarbon based group and preferably at least one is a hydrocarbyl group containing at least 20 carbon atoms.

Olefin polymers suitable for reaction with the monounsaturated carboxylic acids include polymers comprising a major molar amount of $C_2$ to $C_{20}$, e.g. $C_2$ to $C_5$, monoolefin. Such olefins include ethylene, propylene, butylene, isobutylene, pentene, octene-1, or styrene. The polymers can be homopolymers such as polyisobutylene, as well as copolymers of two or more such olefins, such as copolymers of: ethylene and propylene; butylene and isobutylene; or propylene and isobutylene. Other copolymers include those in which a minor molar amount of the copolymer monomers, e.g. 1 to 10 mole percent, is a $C_4$ to $C_{18}$ diolefin, e.g. a copolymer of isobutylene and butadiene or a copolymer of ethylene, propylene and 1,4-hexadiene.

In one embodiment, at least one R group of formula (I) is derived from polybutene, i.e. polymers of $C_4$ olefins including 1-butene, 2-butene and isobutylene. Suitable $C_4$ polymers include polyisobutylene. In another embodiment, at least one R group of formula (I) is derived from ethylene-alpha olefin polymers, including ethylene-propylene-diene polymers. Ethylene-alpha olefin copolymers and ethylene-lower olefin-diene terpolymers are described in numerous patents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800.

In another embodiment, the olefinic bonds of formula (I) are predominantly vinylidene groups, represented by the following formulas:

wherein R is a hydrocarbyl group

wherein R is a hydrocarbyl group.

In one embodiment, the vinylidene content of formula (I) can comprise at least about 30 mole percent having terminal vinylidene groups, at least about 50 mole percent having terminal vinylidene groups, or at least about 70 mole percent having terminal vinylidene groups. Such material and methods for preparing them are described in U.S. Pat. Nos. 5,071,919; 5,137,978; 5,137,980; 5,286,823, 5,408,018, 6,562,913, 6,683,138, 7,037,999 and U.S. publications: 20040176552A1, 20050137363 and 20060079652A1. Such products are commercially available by BASF, under the trade name GLISSOPAL™ and by Texas Petrochemical LP, under the trade name TPC 1105™ and TPC 595™.

Methods of making hydrocarbyl substituted acylating agents from the reaction of monounsaturated carboxylic acid reactants and compounds of formula (I) are well know in the art and disclosed in: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; and 6,165,235.

In one embodiment, the hydrocarbyl-substituted acylating agent is a dicarboxylic acylating agent. In some of these embodiments, the hydrocarbyl-substituted acylating agent comprises polyisobutylene succinic anhydride.

In another embodiment, the hydrocarbyl substituted acylating agent can be made from the reaction of at least one carboxylic reactant represented by the following formulas:

$$(R^3C(O)(R^4)_nC(O))R^5 \qquad (IV)$$

and

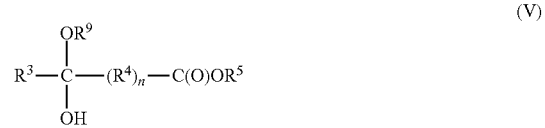

wherein each of $R^3$, $R^5$ and $R^9$ is independently H or a hydrocarbyl group; $R^4$ is a divalent hydrocarbylene group; and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547.

Still other hydrocarbyl substituted acylating agents may be used, though some will produce less stable quaternary salts. In one embodiment the agent is the reaction of a compound of formula (I) with a compound of formula (IV) or (V), where the reaction can optionally be carried out in the presence of at least one aldehyde and/or ketone, such as formaldehyde, or reactive equivalents thereof. Such compounds and the processes for making them are disclosed in U.S. Pat. Nos. 5,840,920; 6,147,036; and 6,207,839. In another embodiment, the hydrocarbyl substituted acylating agent can include methylene bis-phenol alkanoic acid compounds, the condensation product of (i) an aromatic compound and (ii) at least one carboxylic reactant such as the compounds of formula (IV) and (V) described above. The reaction of (i) with (ii) may be carried out in the presence of at least one aldehyde and/or ketone. The reaction may also be carried out in the presence of an acidic catalyst such as organic sulfonic acids, heteropolyacids, and mineral acids. Such compounds and the processes for making them are disclosed in U.S. Pat. Nos. 3,954,808; 5,336,278; 5,458,793; 5,620,949; 5,827,805; and 6,001,781. Other methods of making hydrocarbyl substituted acylating agents can be found in U.S. Pat. Nos. 5,912,213; 5,851,966; and 5,885,944.

The non-quaternized amide and/or ester detergent used to prepare the additives of the present invention are themselves formed when the acylating agents described above are reacted with a compound having an oxygen or nitrogen atom capable of condensing with the acylating agent which further has at least one tertiary amino group.

In one embodiment, the compound having an oxygen or nitrogen atom capable of condensing with the acylating agent and further having a tertiary amino group is represented by the following formulas:

(VI)

wherein X is a alkylene group containing 1 to 4 carbon atoms and $R^2$, $R^3$ and $R^4$ are hydrocarbyl groups; and

(VII)

wherein X is a alkylene group containing 1 to 4 carbon atoms and $R^3$ and $R^4$ are hydrocarbyl groups.

Examples of nitrogen or oxygen containing compounds capable of condensing with the acylating agents, which also have a tertiary amino group include but are not limited to: 1-aminopiperidine, 1-(2-aminoethyl)piperidine, 1-(3-aminopropyl)-2-pipecoline, 1-methyl-(4-methylamino)piperidine, 4-(1-pyrrolidinyl)piperidine, 1-(2-aminoethyl)pyrrolidine, 2-(2-aminoethyl)-1-methylpyrrolidine, N,N-diethylethylenediamine, N,N-dimethylethylenediamine, N,N-dibutylethylenediamine, N,N-diethyl-1,3-diaminopropane, N,N-dimethyl-1,3-diaminopropane, N,N,N'-trimethylethylenediamine, N,N-dimethyl-N'-ethylethylenediamine, N,N-diethyl-N'-methylethylenediamine, N,N,N'-triethylethylenediamine, 3-dimethylaminopropylamine, 3-diethylaminopropylamine, 3-dibutylaminopropylamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-methyldipropylamine, 3,3'-iminobis(N,N-dimethylpropylamine), or combinations thereof. In such embodiments, the resulting additive include a quaternary ammonium amide salt, that is a detergent containing an amine and a quaternary ammonium salt.

In some embodiments the additives of the present invention are derived from N,N-dimethyl-1,3-diaminopropane, N,N-diethyl-1,3-diaminopropane, N,N-dimethylethylenediamine, N,N-diethylethylenediamine, N,N-dibutylethylenediamine, or combinations thereof.

The nitrogen or oxygen containing compounds may further include aminoalkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, 3,3-aminobis(N,N-dimethylpropylamine).

Another type of nitrogen or oxygen containing compounds capable of condensing with the acylating agent and having a tertiary amino group include alkanolamines including but not limited to triethanolamine, N,N-dimethylaminopropanol, N,N-diethylaminopropanol, N,N-diethylaminobutanol, Triisopropanolamine, 1-[2-hydroxyethyl]piperidine, 2-[2-(dimethylamine)ethoxy]-ethanol, N-ethyldiethanolamine, N-methyldiethanol amine, N-butyldiethanolamine, N,N-diethylaminoethanol, N,N-dimethyl aminoethanol, 2-dimethylamino-2-methyl-1-propanol. In embodiments where alkanolamines and/or similar materials are used, the resulting additive includes a quaternary ammonium ester salt, that is a detergent containing an ester group and a quaternary ammonium salt.

In one embodiment the nitrogen or oxygen containing compound is Triisopropanolamine, 1-[2-hydroxyethyl]piperidine, 2-[2-(dimethylamine) ethoxy]-ethanol, N-ethyldiethanolamine, N-methyldiethanolamine, N-butyldiethanolamine, N,N-diethylaminoethanol, N,N-dimethylaminoethanol, 2-dimethylamino-2-methyl-1-propanol, or combinations thereof.

b. The Quaternizing Agent

The quaternized amide and/or ester detergents of the present invention are formed when the non-quaternized detergents described above are reacted with a quaternizing agent. Suitable quaternizing agents include selected dialkyl sulfates, benzyl halides, hydrocarbyl substituted carbonates; hydrocarbyl epoxides in combination with an acid or mixtures thereof.

In one embodiment, the quaternizing agent can include alkyl halides, such as chlorides, iodides or bromides; alkyl sulphonates; dialkyl sulphates, such as, dimethyl sulphate; sultones; alkyl phosphates; such as, C1-12 trialkylphosphates; di C1-12 alkylphosphates; borates; C1-12 alkyl borates; alkyl nitrites; alkyl nitrates; dialkyl carbonates; alkyl alkanoates; O,O-di-C1-12 alkyldithiophosphates; or mixtures thereof.

In one embodiment, the quaternizing agent may be derived from dialkyl sulphates such as dimethyl sulphate, N-oxides, sultones such as propane and butane sultone; alkyl, acyl or aralkyl halides such as methyl and ethyl chloride, bromide or iodide or benzyl chloride, and a hydrocarbyl (or alkyl) substituted carbonates. If the alkyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment, the hydrocarbyl substituted carbonates contain two hydrocarbyl groups that may be the same or different. Examples of suitable hydrocarbyl substituted carbonates include dimethyl or diethyl carbonate.

In another embodiment, the quaternizing agent can be a hydrocarbyl epoxide, as represented by the following formula, in combination with an acid:

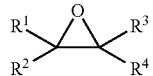
(VIII)

wherein $R^1$, $R^2$, $R^3$ and $R^4$ can be independently H or a hydrocarbyl group contain from 1 to 50 carbon atoms. Examples of hydrocarbyl epoxides include: ethylene oxide, propylene oxide, butylene oxide, styrene oxide and combinations thereof. In one embodiment the quaternizing agent does not contain any styrene oxide.

In some embodiments the acid used with the hydrocarbyl epoxide may be a separate component, such as acetic acid. In other embodiments, for example when the hydrocarbyl acylating agent is a dicarboxylic acylating agent, no separate acid component is needed. In such embodiments, the detergent may be prepared by combining reactants which are essentially free to free of an acid component, such as acetic acid, and rely on the acid group of the hydrocarbyl acylating agent instead. In other embodiments, a small amount of an acid component may be present, but at <0.2 or even <0.1 moles of acid per mole of hydrocarbyl acylating agent.

In certain embodiments the molar ratio of detergent having an amine functionality to quaternizing agent is 1:0.1 to 2, or 1:1 to 1.5, or 1:1 to 1.3.

The Quaternized Amide and/or Ester Detergent Containing Compositions

The quaternized amide and/or ester detergents of the present invention may be used as an additive in various types of compositions, including fuel compositions and additive concentrate compositions.

a. Fuel Compositions

The quaternized detergents of the present invention may be used as an additive in fuel compositions. The fuel compositions of the present invention comprise the fuel additive described above and a liquid fuel, and is useful in fueling an internal combustion engine or an open flame burner. These compositions may also contain one or more additional additives. These optional additives are described below. In some embodiments, the fuels suitable for use in the present invention include any commercially available fuel, and in some embodiments any commercially available diesel fuel and/or biofuel.

The description that follows of the types of fuels suitable for use in the present invention refer to the fuel that may be present in the additive containing compositions of the present invention as well as the fuel and/or fuel additive concentrate compositions to which the additive containing compositions may be added.

Fuels suitable for use in the present invention are not overly limited. Generally, suitable fuels are normally liquid at ambient conditions e.g., room temperature (20 to 30° C.) or are normally liquid at operating conditions. The fuel can be a hydrocarbon fuel, non-hydrocarbon fuel, or mixture thereof.

The hydrocarbon fuel can be a petroleum distillate, including a gasoline as defined by ASTM specification D4814, or a diesel fuel, as defined by ASTM specification D975. In one embodiment the liquid fuel is a gasoline, and in another embodiment the liquid fuel is a non-leaded gasoline. In another embodiment the liquid fuel is a diesel fuel. The hydrocarbon fuel can be a hydrocarbon prepared by a gas to liquid process to include for example hydrocarbons prepared by a process such as the Fischer-Tropsch process. In some embodiments, the fuel used in the present invention is a diesel fuel, a biodiesel fuel, or combinations thereof.

Suitable fuels also include heavier fuel oils, such as number 5 and number 6 fuel oils, which are also referred to as residual fuel oils, heavy fuel oils, and/or furnace fuel oils. Such fuels may be used alone or mixed with other, typically lighter, fuels to form mixtures with lower viscosities. Bunker fuels are also included, which are generally used in marine engines. These types of fuels have high viscosities and may be solids at ambient conditions, but are liquid when heated and supplied to the engine or burner it is fueling.

The non-hydrocarbon fuel can be an oxygen containing composition, often referred to as an oxygenate, which includes alcohols, ethers, ketones, esters of a carboxylic acids, nitroalkanes, or mixtures thereof. Non-hydrocarbon fuels can include methanol, ethanol, methyl t-butyl ether, methyl ethyl ketone, transesterified oils and/or fats from plants and animals such as rapeseed methyl ester and soybean methyl ester, and nitromethane.

Mixtures of hydrocarbon and non-hydrocarbon fuels can include, for example, gasoline and methanol and/or ethanol, diesel fuel and ethanol, and diesel fuel and a transesterified plant oil such as rapeseed methyl ester and other bio-derived fuels. In one embodiment the liquid fuel is an emulsion of water in a hydrocarbon fuel, a non-hydrocarbon fuel, or a mixture thereof.

In several embodiments of this invention the liquid fuel can have a sulphur content on a weight basis that is 50,000 ppm or less, 5000 ppm or less, 1000 ppm or less, 350 ppm or less, 100 ppm or less, 50 ppm or less, or 15 ppm or less.

The liquid fuel of the invention is present in a fuel composition in a major amount that is generally greater than 95% by weight, and in other embodiments is present at greater than 97% by weight, greater than 99.5% by weight, greater than 99.9% by weight, or greater than 99.99% by weight.

b. Additive Concentrate Compositions

Additive concentrates are compositions that contain one or more additives and which may also contain some amount of fuel, oil, or a diluent of some type. These concentrates can then be added to other compositions as a convenient way to handle and deliver the additives, resulting in the final compositions such as the fuel compositions described above.

The additive concentrate compositions of the present invention contain one or more of the quaternized detergents described above and an optional diluent, which may be any of the fuels described above, a solvent, a diluent oil, or similar material. These compositions may also contain one or more of the additional additives described below.

c. Optional Additional Additives

The fuel and additive compositions of the present invention include the quaternized detergents described above and may also include one or more additional additives. Such additional performance additives can be added to a fuel composition depending on several factors to include the type of internal combustion engine and the type of fuel being used in that engine, the quality of the fuel, and the service conditions under which the engine is being operated.

The additional performance additives can include: an antioxidant such as a hindered phenol or derivative thereof and/or a diarylamine or derivative thereof; a corrosion inhibitor; and/or a detergent/dispersant additive, other than the fuel additive of the present invention, such as a polyetheramine or nitrogen containing detergent, including but not limited to PIB amine detergents/dispersants, succinimide detergents/dispersants, and other quaternary salt detergents/dispersants including quaternary ammonium imide salts, that is a detergent containing an imide group and a quaternary ammonium salt.

The additional performance additives may also include: a cold flow improver such as an esterified copolymer of maleic anhydride and styrene and/or a copolymer of ethylene and vinyl acetate; a foam inhibitor and/or antifoam agent such as a silicone fluid; a demulsifier such as a polyalkoxylated alcohol; a lubricity agent such as a fatty carboxylic acid; a metal deactivator such as an aromatic triazole or derivative thereof, including but not limited to benzotriazole; and/or a valve seat recession additive such as an alkali metal sulfosuccinate salt.

Suitable antifoams also include organic silicones such as polydimethyl siloxane, polyethylsiloxane, polydiethylsiloxane, polyacrylates and polymethacrylates, trimethyl-trifluoro-propylmethyl siloxane and the like.

The additional additives may also include a biocide; an antistatic agent, a deicer, a fluidizer such as a mineral oil and/or poly(alpha-olefin) and/or polyether, and a combustion improver such as an octane or cetane improver.

The additional performance additives, which may be present in the fuel additive compositions and fuel compositions of the present invention, also include di-ester, di-amide, ester-amide, and ester-imide friction modifiers prepared by reacting a dicarboxylic acid (such as tartaric acid) and/or a tricarboxylic acid (such as citric acid), with an amine and/or alcohol, optionally in the presence of a known esterification catalyst. These friction modifiers, often derived from tartaric acid, citric acid, or derivatives thereof, may be derived from amines and/or alcohols that are branched, resulting in friction modifiers that themselves have significant amounts of branched hydrocarbyl groups present within it structure. Examples of suitable branched alcohols used to prepare such friction modifiers include 2-ethylhexanol, isotridecanol, Guerbet alcohols, and mixtures thereof.

The additional performance additives may comprise a high TBN nitrogen containing detergent/dispersant, such as a succinimide, that is the condensation product of a hydrocarbyl-substituted succinic anhydride with a poly(alkyleneamine). Succinimide detergents/dispersants are more fully described in U.S. Pat. Nos. 4,234,435 and 3,172,892.

Another class of nitrogen-containing detergent/dispersant is the Mannich bases. These are materials which are formed by the condensation of a higher molecular weight, alkyl substituted phenol, an alkylene polyamine, and an aldehyde such as formaldehyde. Such materials are described in more detail in U.S. Pat. No. 3,634,515. Other nitrogen-containing detergents/dispersants include polymeric dispersant additives, which are generally hydrocarbon-based polymers which contain nitrogen-containing polar functionality to impart dispersancy characteristics to the polymer.

An amine is typically employed in preparing the high TBN nitrogen-containing dispersant. One or more poly(alkyleneamine)s may be used, and these may comprise one or more poly(ethyleneamine)s having 3 to 5 ethylene units and 4 to 6 nitrogen units. Such materials include triethylenetetramine (TETA), tetraethylenepentamine (TEPA), and pentaethylenehexamine (PEHA). Such materials are typically commercially available as mixtures of various isomers containing a range number of ethylene units and nitrogen atoms, as well as a variety of isomeric structures, including various cyclic structures. The poly(alkyleneamine) may likewise comprise relatively higher molecular weight amines known in the industry as ethylene amine still bottoms.

The additional performance additives may include quaternary ammonium imide salts. In some embodiments the compositions of the present invention are substantially free to free of quaternary ammonium imide salts. Quaternary ammonium imide salts are similar to the quaternary ammonium amide and/or ester salts of the present invention, except that the non-quaternized detergent/dispersant used in the preparation of the imide salts contains an imide group, instead of the amide and/or ester group specified by the present invention.

The additional performance additives can each be added directly to the additive and/or the fuel compositions of the present invention, but they are generally mixed with the fuel additive to form an additive composition, or concentrate, which is then mixed with fuel to result in a fuel composition. The fuel compositions are described in more detail above.

The Process of Preparing the Quaternized Amide and/or Ester Detergent

The present invention provides a process of preparing quaternized amide and/or ester detergent where the process includes: reacting (a) a non-quaternized amide and/or ester detergent having a tertiary amine functionality with (b) a quaternizing agent; thereby obtaining the quaternized detergent.

The processes of the present in invention may also be described as a process for preparing a quaternized amide and/or ester detergent comprising the steps of: (1) mixing (a) a non-quaternized amide and/or ester detergent having an amine functionality, (b) a quaternizing agent and (c) a protic solvent, which in some embodiments is free of methanol; (2) heating the mixture to a temperature between 50° C. to 130° C.; and (3) holding for the reaction to complete; thereby obtaining the quaternized amide and/or ester detergent. In one embodiment the reaction is carried out at a temperature of less than 80° C., or less then 70° C. In other embodiments the reaction mixture is heated to a temperature of about 50° C. to 120° C., 80° C., or 70° C. In still other embodiments where the hydrocarbyl acylating agent is derived from a monocarboxylic acid, the reaction temperature may be 70° C. to 130° C. In other embodiments where the hydrocarbyl acylating agent is derived from a dicarboxylic acid, the reaction temperature may be 50° C. to 80° C. or 50° C. to 70° C.

In some embodiments the processes of the present invention are free of the addition of any acid reactant, such as acetic acid. The salt product is obtained in these embodiments despite the absence of the separate acid reactant.

As described above, in some embodiments the non-quaternized amide and/or ester detergent is the condensation product of hydrocarbyl-substituted acylating agent and a compound having an oxygen or nitrogen atom capable of condensing with said acylating agent and further having at least one tertiary amino group. Suitable quaternizing agents and compounds having an oxygen or nitrogen atom are also described above.

a. The Protic Solvent

The additives of the present invention may be derived in the presence of a protic solvent. In some embodiments the process used to prepare these additives is substantially free to free of methanol. Substantially free of methanol can mean less than 0.5, 0.1 or 0.05 percent by weight methanol in the reaction mixture, and may also mean completely free of methanol.

Suitable protic solvents include solvents that have dielectric constants of greater than 9. In one embodiment the protic solvent includes compounds that contain 1 or more hydroxyl (—OH) functional groups, and may include water.

In one embodiment, the solvents are glycols and glycol ethers. Glycols containing from 2 to 12 carbon atoms, or from 4 to 10, or 6 to 8 carbon atoms, and oligomers thereof (e.g., dimers, trimers and tetramers) are generally suitable for use. Illustrative glycols include ethylene glycol, propylene glycol, diethylene glycol, dipropylene glycol, 1,4-butanediol, 2-methyl-1,3-propanediol, neopentyl glycol, triethylene glycol, polyethylene glycol and the like and oligomers and polymeric derivative and mixtures thereof. Illustrative glycol ethers include the $C_1$-$C_6$ alkyl ethers of propylene glycol, ethylene glycol and oligomers thereof such as di-, tri- and tetra glycol ethers of methyl, ethyl, propyl, butyl or hexyl. Suitable glycol ethers include ethers of dipropylene glycol, tripropylene glycol diethylene glycol, triethylene glycol; ethyl diglycol ether, butyl diglycol ether, methoxytriglycol, ethoxytriglycol, butoxytriglycol, methoxytetraglycol, butoxytetraglycol.

Suitable solvents for use in the invention also include certain alcohols. In one embodiment, these alcohols contain at least 2 carbon atoms, and in other embodiments at least 4, at least 6 or at least 8 carbon atoms. In another embodiment, the solvent of the present invention contains 2 to 20 carbon atoms, 4 to 16 carbon atoms, 6 to 12 carbon atoms, 8 to 10 carbon atoms, or just 8 carbon atoms. These alcohols normally have a 2-($C_{1-4}$ alkyl) substituent, namely, methyl, ethyl, or any isomer of propyl or butyl. Examples of suitable alcohols include 2-methylheptanol, 2-methyldecanol, 2-ethylpentanol, 2-ethylhexanol, 2-ethylnonanol, 2-propylheptanol, 2-butylheptanol, 2-butyloctanol, isooctanol, dodecanol, cyclohexanol, methanol, ethanol, propan-1-ol, 2-methylpropan-2-ol, 2-methylpropan-1-ol, butan-1-ol, butan-2-ol, pentanol and its isomers, and mixtures thereof. In one embodiment the solvent of the present invention is 2-ethylhexanol, 2-ethyl nonanol, 2-propylheptanol, or combinations thereof. In one embodiment the solvent of the present invention includes 2-ethylhexanol.

The solvent can be any of the commercially available alcohols or mixtures of such alcohols and also includes such alcohols and mixtures of alcohols mixed with water. In some embodiments the amount of water present may be above 1 percent by weight of the solvent mixture. In other embodiments the solvent mixture may contain traces of water, with the water content being less than 1 or 0.5 percent by weight.

The alcohols can be aliphatic, cycloaliphatic, aromatic, or heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols.

While not wishing to be bound by theory, it is believed that a polar protic solvent is required in order to facilitate the dissociation of the acid into ions and protons. The dissociation is required to protonate the ion formed when the detergent having an amine functionality initially reacts with the quaternizing agent. In the case where the quaternizing agent is an alkyl epoxide the resulting ion would be an unstable alkoxide ion. The dissociation also provides a counter ion from the acid group of the additive that acts to stabilize the quaternary ammonium ion formed in the reaction, resulting in a more stable product.

The solvent may be present such that the weight ratio of the amount of detergent having an amine functionality to the amount of polar solvent is in one set of embodiments from 20:1 to 1:20; or from 10:1 to 1:10. In additional embodiments, the detergent to solvent weight ratio can be from 1:10 to 1:15; from 15:1 to 10:1; or from 5:1 to 1:1.

INDUSTRIAL APPLICATION

In one embodiment, the process of the present invention produces a quaternized amide and/or ester detergent. The quaternized detergent can be used as an additive for use in a fuel for use in an internal combustion engine and/or an open flame burner.

The internal combustion engine includes spark ignition and compression ignition engines; 2-stroke or 4-stroke cycles; liquid fuel supplied via direct injection, indirect injection, port injection and carburetor; common rail and unit injector systems; light (e.g. passenger car) and heavy duty (e.g. commercial truck) engines; and engines fuelled with hydrocarbon and non-hydrocarbon fuels and mixtures thereof. The engines may be part of integrated emissions systems incorporating such elements as; EGR systems; aftertreatment including three-way catalyst, oxidation catalyst, NOx absorbers and catalysts, catalyzed and non-catalyzed particulate traps optionally employing fuel-borne catalyst; variable valve timing; and injection timing and rate shaping.

The open flame burner burning may be any open-flame burning apparatus equipped to burn a liquid fuel. These include domestic, commercial and industrial burners. The industrial burners include those requiring preheating for proper handling and atomization of the fuel. Also included are oil fired combustion units, oil fired power plants, fired heaters and boilers, and boilers for use in ships and marine applications including deep draft vessels. Included are boilers for power plants, utility plants, and large stationary and marine engines. The open-flame fuel burning apparatus may be an incinerator such as rotary kiln incinerator, liquid injection kiln, fluidized bed kiln, cement kiln, and the like. Also included are steel and aluminum forging furnaces. The open-flame burning apparatus may be equipped with a flue gas recirculation system The additives described above, in addition to being used as detergents in fuel compositions, may also be used as a dispersant-type additive in lubricating oil compositions. Such lubricating compositions may comprise a minor amount of the quaternary ammonium salts described herein and a major amount of an oil of lubricating viscosity. The specific levels at which the additive may be present are the same as those described above for the fuel compositions. The lubricating compositions may also contain any of the optional additional additives described above.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples. While the Examples are provided to illustrate the invention, they are not intended to limit it.

Preparatory Material A

Polyisobutylene succinic anhydride (500 g), which itself is prepared by reacting 1000 number average molecular weight high vinylidene polyisobutylene and maleic anhydride, is heated to 70° C. and charged to a jacketed reaction vessel fitted with stirrer, condenser, feed pump attached to subline addition pipe, nitrogen line and thermocouple/temperature controller system. Heptane (76.9 grams) is added to the reaction vessel and then dimethylaminopropylamine (52.3 g) is added over time, holding the reaction temperature at 70° C. Once the addition is complete, the reaction vessel is held at 70° C. for 1 hour. The resulting product, a non-quaternized succinamide detergent, is cooled and collected.

Preparatory Material B

Polyisobutylene succinic anhydride (100 pbw) which itself is prepared by reacting 1000 number average molecular weight high vinylidene polyisobutylene and maleic anhydride is heated to 80° C. and is charged to a jacketed reaction vessel fitted with stirrer, condenser, feed pump attached to subline addition pipe, nitrogen line and thermocouple/temperature controller system. The reaction vessel is heated to 100° C. Dimethylaminopropylamine (10.9 pbw) is charged to the reaction, maintaining the batch temperature below 120° C., over an 8 hour period. The reaction mixture is then heated to 150° C. and maintained at temperature for 4 hours. The resulting product, a non-quaternized succinimide detergent, is cooled and collected.

Comparative Example 1

Preparatory Material B, a non-quaternized succinimide detergent, (100 pbw) is charged to a deck-scale reaction vessel. Acetic acid (5.9 pbw) and 2-ethylhexanol (38.4 pbw) are added to the vessel and the mixture is stirred and heated to 75° C. Propylene oxide (8.7 pbw) is added the reaction vessel over 4 hours, holding the reaction temperature at 75° C. The batch is held at temperature for 4 hours. The product, which is primarily a quaternized succinimide detergent, is cooled and collected.

Comparative Example 2

Preparatory Material B, a non-quaternized succinimide detergent, (100 pbw), is charged to a lab-scale reaction vessel. Acetic acid (5.8 pbw) and 2-ethylhexanol (38.4 pbw) are added to the vessel and the mixture is stirred and heated to 75° C. Propylene oxide (8.5 pbw) is added the reaction vessel over 4 hours, holding the reaction temperature at 75° C. The batch is held at temperature for 4 hours. The product, which is primarily a quaternized succinimide detergent, is cooled and collected.

Example 3

Preparatory Material A, a non-quaternized succinamide detergent (470 g), is charged to a 2-liter round bottom flange flask with water condenser attached. 2-ethylhexanol (180.6 g) is added to the flask and the mixture is stirred with an overhead stirrer and heated to 55° C. under a nitrogen blanket. Propylene oxide (40.2 g) is then added to the reaction vessel via syringe pump over 4 hours, holding the reaction temperature at 55° C. The batch is held at temperature for 16 hours. The product, which is primarily a quaternized succinamide detergent, is cooled and collected.

The materials are tested to determine the extent of the reaction and to discern between the amide and imide versions of the quaternary ammonium salt detergents produced. Electrospray Ionization (ESI) spectroscopy is used to analyze the samples, and using an internally developed protocol, the relative amounts of the imide containing structure, the amide containing structure and the tertiary amine (non-quaternized) structure are calculated. The results of this testing are presented in Table 1.

TABLE 1

| | ESI Mass Spec Results | | |
|---|---|---|---|
| Ex No | Percent Imide Quat | Percent Amide Quat | Percent Tertiary Amine |
| Comp Ex 1 | 49 | 27 | 24 |
| Comp Ex 2 | 69 | 12 | 19 |
| Ex 3 | 8 | 85 | 7 |

The results show that Example 3 contains a major amount of a quaternized succinamide detergent. The other examples all contain larger amounts of the quaternized succinimide detergent. Example 3 also shows the best overall conversion, at it has the smallest amount of tertiary amine remaining in the sample. The tertiary amine values represent non-quaternized detergent still present in the sample that was not quaternized in the reaction.

The examples are blended into DF-79 reference fuel, obtained from Haltermann Specialty Products, and are tested in a screen test using the Coordinating European Council's (CEC) F-98-08 DW10 testing protocol, which utilizes a Peugeot DW-10 engine. This is a light duty direct injection, common rail engine test that measures engine power loss, which relates to fuel detergent additive efficiency, where lower power loss values indicate better detergent performance. The test engine is representative of new engines coming into the market and the test method is known in the field. The results of the engine testing are presented in Table 2.

TABLE 2

DW10 Results

| Fuel Sample | Fuel Additive Ex No | Treat Rate of Fuel Additive (PPM) | Percent Power Loss |
|---|---|---|---|
| A-Baseline | None | 0 | 3.9% |
| B | Comp Ex 1 | 73 | 2.8% |
| C | Ex 3 | 73 | 2.5% |

The results show that when using fuel compositions containing the additives of the present invention, Sample C, which contains the quaternized succinamide detergent of Example 3, gives slightly better, but comparable results to the Sample B, which contains the quaternized succinimide detergent of Comparative Example 1.

The three additives prepared in the examples above are also tested in an oil compatibility test, which measures the compatibility of a fuel additive with engine oil additives. The test is considered a no harm test in that it determines whether the fuel additive is compatible with engine oil additives it is likely to come into contact with during the operation of an engine. The test procedure involves mixing the neat fuel additive with a neat engine oil additive package and then holding the mixture at 90 degrees C. for 3 days. The mixture is then filtered. Test results from the stability test include a pass/fail on whether the mixture remains liquid or gels. Gelation is determined by a visual inspection of the sample. Test results also include a pass/fail on whether the sample, if it remains liquid, can be within 3 minutes. The results of this testing is presented in Table 3.

TABLE 3

Oil Compatibility Testing

| Ex No | Gel Check | Filter Time |
|---|---|---|
| Comp Ex 1 | PASS | FAIL |
| Comp Ex 2 | PASS | FAIL |
| Ex 3 | PASS | PASS |

The results show that the quaternized succinamide detergents additive of the present invention is more compatible with engine oil additives than the quaternized succinimide detergent additives of the comparative examples.

Two of the additives prepared in the examples above are also tested in a thermal stability test. Samples of additives are stored at 100 degrees C. for 18 hours and then retested by FTIR, in order to evaluate the amount of thermal degradation of the additives that occurs. The results are presented in Table 4.

TABLE 4

Thermal Stability Testing

| Ex No | FTIR Salt:Hydrocarbon Ratio[1] Before Testing | FTIR Salt:Hydrocarbon Ratio[1] After Testing | Percent Difference in Ratio |
|---|---|---|---|
| Comp Ex 2 | 0.60 | 0.15 | −75% |
| Ex 3 | 0.58 | 0.41 | −17% |

[1]The salt has a FTIR spectra peak at 1560 cm$^{-1}$, and the hydrocarbon has a FTIR peak at 1460 cm$^{-1}$. The values in the table above are the ratio of these peaks Comparative Example 2 shows a 75% decrease of the salt hydrogen ratio representing a significant reduction in the amount of quaternary ammonium salt present in the sample. This indicated that the additive of Comparative Example 2 is thermally degrading in significant amounts.

Example 3 shows a 17% decrease of the salt hydrogen ratio, which also represents a reduction in the amount of quaternary ammonium salt present, but it is a significantly smaller reduction compared to that for Comparative Example 2. The results show that the quaternized succinamide detergent additives of the present invention are more thermally stable than the quaternized succinimide detergent additives of the comparative examples.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Except where otherwise indicated, all numerical quantities in the description specifying amounts or ratios of materials are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

The invention claimed is:

1. A composition comprising a quaternary ammonium salt detergent containing an amide group, where the quaternized detergent comprises the reaction product of:
   (a) a non-quaternized detergent containing an amide group, where the detergent has a tertiary amine functionality; and
   (b) a quaternizing agent;
   and wherein the reaction of (a) and (b) is essentially free of any additional acid component other than an acid group present in the structure of the detergent; and wherein (b) the quaternizing agent comprises ethylene oxide, propylene oxide, butylene oxide, styrene oxide, or combinations thereof.

2. The composition of claim 1, wherein a protic solvent is present during the reaction of (a) and (b).

3. The composition of claim 2, wherein the protic solvent comprises a linear or branched alcohol containing 1 to 10 carbon atoms.

4. The composition of claim 1, wherein (a) the non-quaternized detergent comprises the product of a hydrocarbyl-substituted acylating agent and a compound having a nitrogen atom capable of reacting with the acylating agent and further having at least one tertiary amino group.

5. The composition of claim 4, wherein the hydrocarbyl-substituted acylating agent comprises polyisobutylene succinic anhydride.

6. The composition of claim 4, wherein the compound having a nitrogen atom capable of reacting with the acylating agent comprises 1-aminopiperidine, 1-(2-aminoethyl) piperidine, 1-(3-aminopropyl)-2-pipecoline, 1-methyl-(4-methylamino)piperidine, 4-(1-pyrrolidinyl)piperidine, 1-(2-aminoethyl)pyrrolidine, 2-(2-aminoethyl)-1-methylpyrrolidine, N,N-diethylethylenediamine, N,N-dimethylethylenediamine, N,N-dibutylethylenediamine, N,N-dimethyl-1,3-diaminopropane, N,N-diethyl-1,3-diaminopropane, N,N-dibutyl-1,3-diaminopropane, N,N,N'-trimethylethylenediamine, N,N-dimethyl-N'-ethylethylenediamine, N,N-diethyl-N'-methylethylenediamine, N,N,N'-triethylethylenediamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-methyldipropylamine, 3,3'-iminobis(N,N-dimethylpropylamine), or combinations thereof.

7. The composition of claim 4, wherein the compound having a nitrogen atom capable of reacting with the acylating agent comprises N,N-diethylethylenediamine, N,N-dimethylethylenediamine, N,N-dibutylethylenediamine, N,N-dimethyl-1,3-diaminopropane, N,N-diethyl-1,3-diaminopropane, or combinations thereof.

8. A fuel composition comprising the composition of claim 1 and further comprising a fuel.

9. The fuel composition of claim 8, further comprising one or more fuel additives other than the quaternary ammonium salt detergent.

10. A method of operating an internal combustion engine or open flame burner comprising supplying to the engine or burner the fuel composition of claim 8.

11. A process of making a quaternary ammonium salt detergent comprising:
  I. reacting (a) a non-quaternized detergent containing an amide group, where the detergent has a tertiary amine functionality with (b) a quaternizing agent;
  thereby obtaining a quaternized detergent;
  wherein a protic solvent is present during the reaction of (a) and (b) and wherein the reaction of (a) and (b) is free of any additional acid component other than an acid group present in the structure of the detergent; and
  wherein (b) the quaternizing agent comprises ethylene oxide, propylene oxide, butylene oxide, styrene oxide, or combinations thereof.

12. The process of claim 11, wherein the protic solvent comprises a linear or branched alcohol containing 1 to 10 carbon atoms.

13. The process of claim 12, wherein (a) the non-quaternized detergent comprises the product of a hydrocarbyl-substituted acylating agent and a compound having a nitrogen atom capable of reacting with the acylating agent and further having at least one tertiary amino group.

14. A quaternized detergent made by the process of claim 11.

15. The fuel composition of claim 9, wherein the fuel composition comprises at least one lubricity agent that is a fatty carboxylic acid.

* * * * *